United States Patent [19]

MacManus

[11] 3,854,700
[45] Dec. 17, 1974

[54] MACHINE FOR PRODUCING AERATED FOOD PRODUCTS

[76] Inventor: John MacManus, 143-16-22nd Rd., Whitestone, N.Y. 11357

[22] Filed: Sept. 6, 1973

[21] Appl. No.: 394,779

[52] U.S. Cl.......................... 259/4, 259/95, 418/152
[51] Int. Cl............................................. B01f 15/02
[58] Field of Search............ 259/4, 18, 36, 95, 147; 261/140, 141; 417/321, 310, DIG. 1; 418/178, 235, 152, 153

[56] References Cited
UNITED STATES PATENTS

| | | | |
|---|---|---|---|
| 2,716,947 | 9/1955 | Janik | 418/153 |
| 2,748,716 | 6/1956 | Janik | 418/32 |
| 3,074,350 | 1/1963 | Hanna | 418/154 |
| 3,187,993 | 6/1965 | Rhodes | 418/131 |
| 3,282,222 | 11/1966 | Raufeisen | 417/321 |
| 3,606,266 | 9/1971 | MacManus | 259/4 |
| 3,700,214 | 10/1972 | MacManus | 259/4 |

*Primary Examiner*—Robert W. Jenkins

[57] ABSTRACT

The machine includes a motor-driven pump having an inlet connected both to an air intake and to an unpressurized liquid product container, whereby the liquid product and air are simultaneously drawn into the pump. The pump outlet is connected to a static, narrow orifice homogenizer which emulsifies the liquid and air mixture. An ejector is interposed between the pump outlet and the homogenizer, and is connected to a second container which holds an additive. A variable regulating means is associated with the ejector to control the ratio of the portion of additive to whipped product. Under operation of the pump, the ejector introduces the additive into the liquid and air mixture. The pump has also been improved to increase its life. Among the improvements are changes in the bearing and seal construction, venting the seal area, and a replaceable combination seal and wear pad between the rotor and head.

20 Claims, 9 Drawing Figures

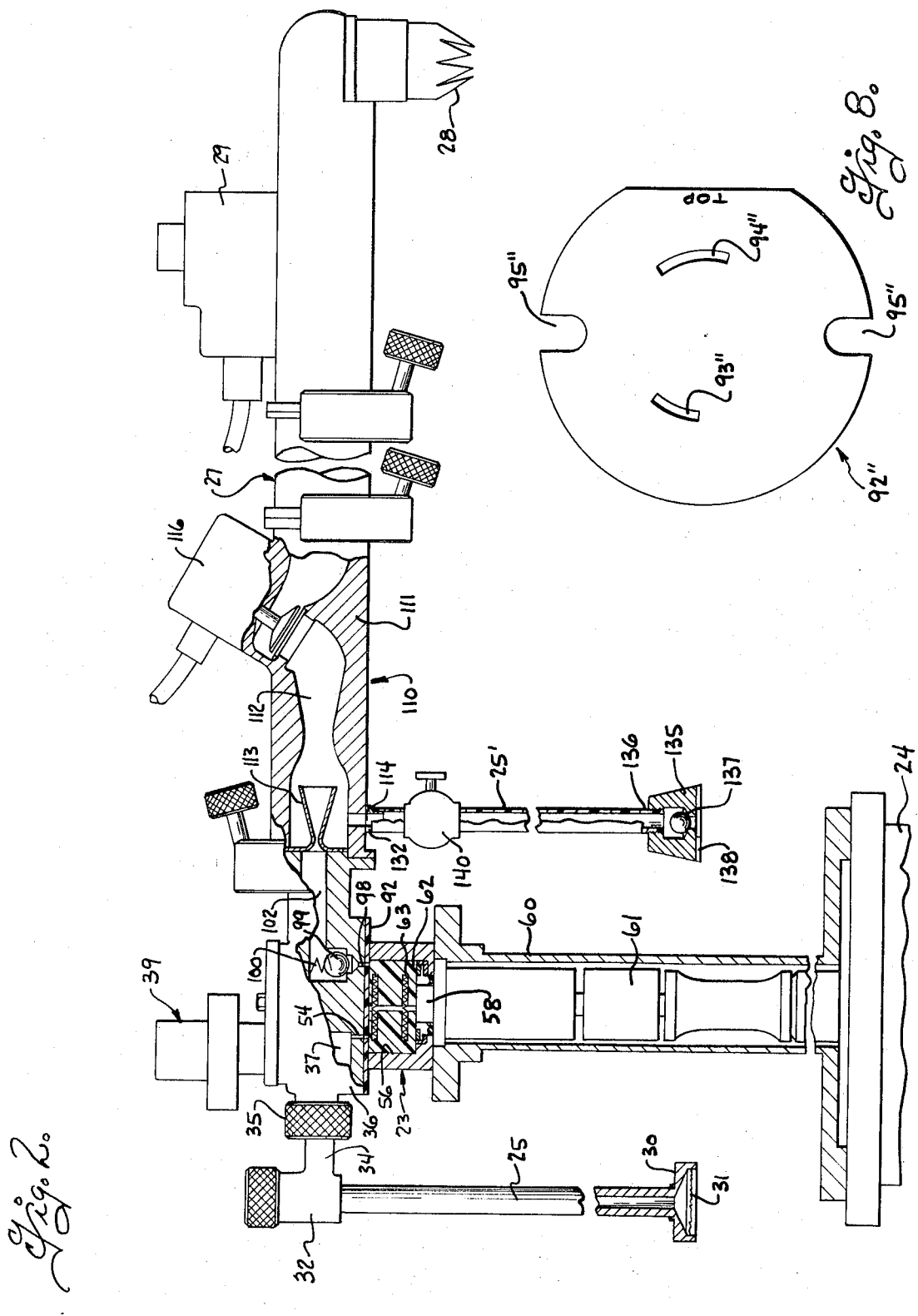

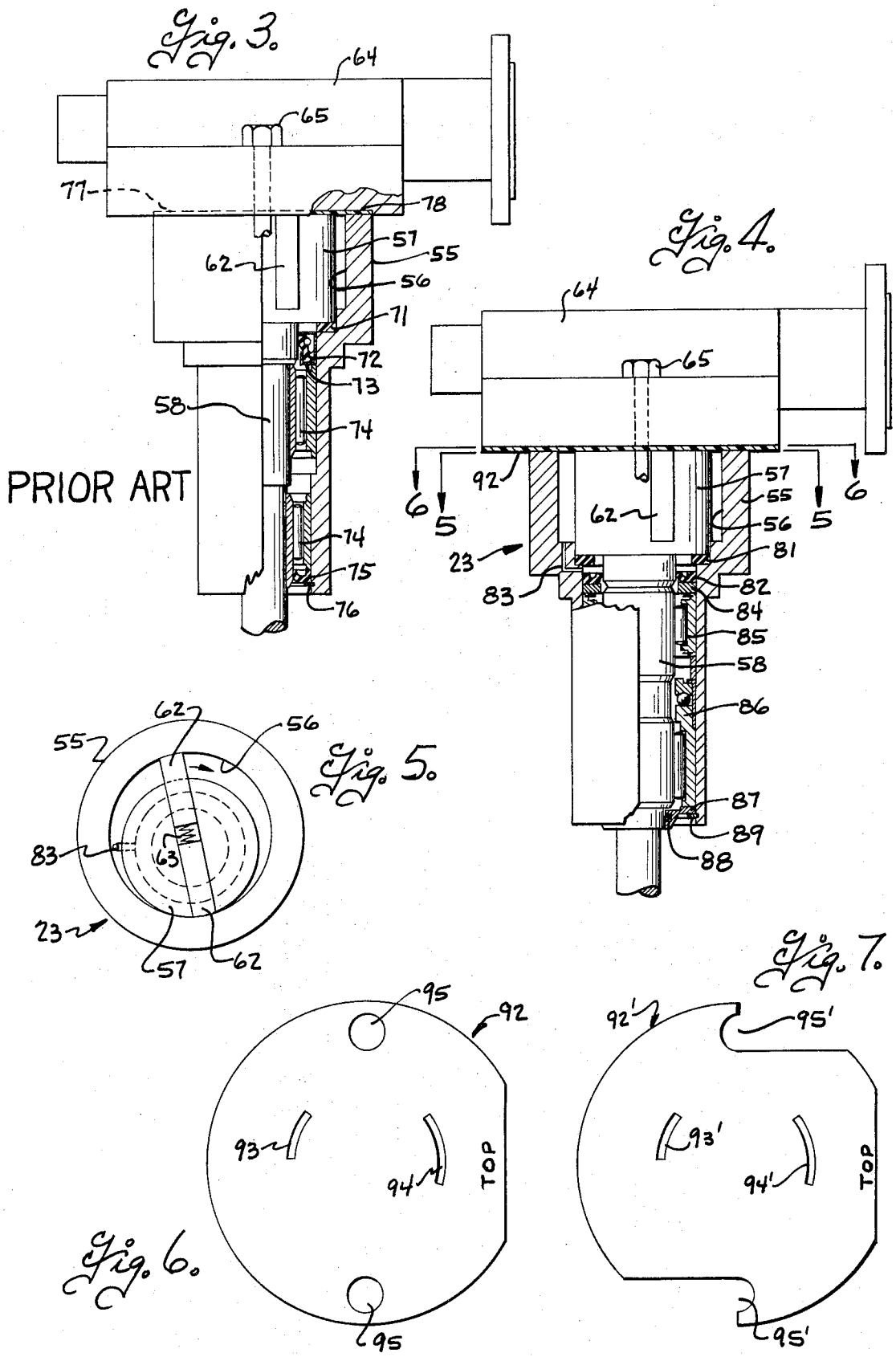

MACHINE FOR PRODUCING AERATED FOOD PRODUCTS

Background

The invention pertains generally to whipping apparatus and more particularly to improvements in machines utilizing a static homogenizer for producing aerated food products.

An important use of whipping apparatus is to produce aerated food products such as whipped cream, imitation whipped cream and toppings for application to food products such as cakes, pies and the like at commercial bakeries, restaurants, or fastfood outlets. There, the aerated or whipped food product must remain stiff and stable for relatively long periods of time and under adverse conditions. Suitable apparatus are disclosed in my U.S. Pat. No. 3,606,266 issued Sept. 20, 1971; my U.S. Pat. No. 3,700,214 issued Oct. 24, 1972; and my U.S. Pat. No. 3,713,841 issued Jan. 30, 1973.

It is desirable to be able to add coloring, flavoring and the like into the product to be aerated or whipped. The above-mentioned U.S. Pat. No. 3,713,841 provides a hopper upstream of the pump inlet for this purpose. Some additives are particularly harsh on the pump mechanism and considerably reduce its life. I contemplate the desirability of being able to supply any such additive downstream of the pump but before the outlet of the static homogenizer.

The prior art pump illustrated in FIG. 3 is a detail of the pump shown in my above-mentioned U.S. Pats. Nos. 3,606,266 and 3,700,214. These pumps perform under high pressure; that is at least 75 p.s.i., preferably over 100 p.s.i. and in some circumstances 200 p.s.i. and more. Under adverse conditions the life of the pump illustrated in FIG. 3 is shorter than desirable. Through much development I have been able to triple the life of the pump. I have also eliminated a part which was impossible to replace on site, and have substituted an easily replaceable part.

Summary

The present invention relates to improvements in machines utilizing a static homogenizer for producing aerated food products and more particularly to such a machine in which an additive is introduced into the mixture prior to exit from the static homogenizer. Another aspect of the invention relates to machines of the type described and having an improved pump for drawing in liquid product and air simultaneously.

It is an object of the invention to provide a machine having a static homogenizer and a pump having greater longevity than heretofore.

A further object is to provide a machine in accordance with the foregoing in which the pump may be more readily repaired than prior art constructions and at a fraction of the cost.

Another object is to provide a machine of the type described in which the pump is provided with a unique combination wear pad and seal between the rotor and head.

Still another object is to provide a machine of the type described in which the pump construction is greatly improved.

It is an object of the present invention to provide a machine having a static homogenizer and apparatus for introducing an additive prior to exit from the static homogenizer.

A further object is to provide a machine in accordance with the foregoing object in which the additive is introduced into the mix downstream of the pump outlet.

A still further object is to provide a machine of the type described including an ejector in the combination.

Yet another object is to provide a machine in accordance with the foregoing object which includes apparatus to vary the amount of additive introduced into the whipped product.

These and other objects and advantages of the present invention will become apparent as the same becomes better understood from the following detailed description when taken in conjunction with the accompanying drawings.

Drawings

FIG. 2 is a side view, partly in section and partly in elevation, of the pump, ejector and associated mechanism;

FIG. 3 is a side elevation, partly in central section, of a prior art pump;

FIG. 4 is a side elevation, partly in central section, of an improved pump;

FIG. 5 is a view taken along line 5-5 of FIG. 4;

FIG. 6 is a view taken along line 6-6 of FIG. 4;

FIG. 7 is a view of an alternate construction of the combination seal and wear pad;

Figure 9:
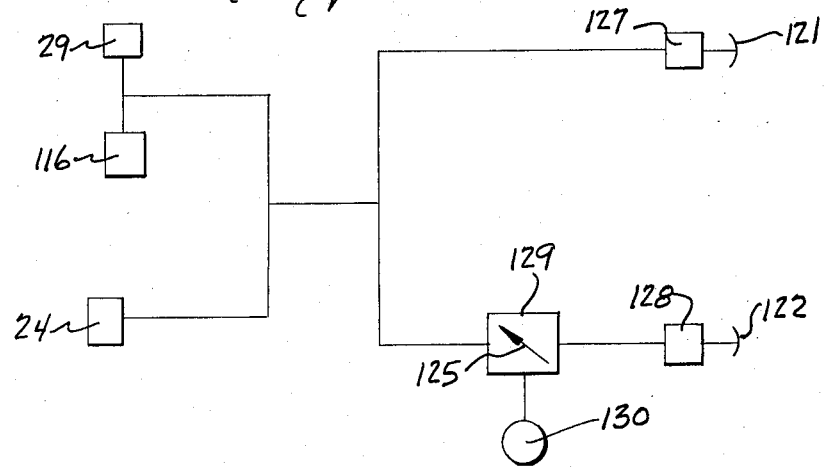

FIG. 8, on sheet two of the drawings, is another alternate construction of the combination seal and wear pad; and FIG. 9, on sheet one of the drawings, is an electric circuit diagram representing a control system of the machine.

Description

Reference is now made more particularly to the drawings which illustrate the best presently known mode of carrying out the invention and wherein similar reference characters indicate the same parts throughout the several views.

The machine has an outer cabinet 13 with legs 14 which are intended to stand on a counter or table. The cabinet 13 contains an internal partition 15 above which is an insulated compartment 16 covered by a removable lid 17 which has openings closed by two smaller lids 18. The compartment 16 is insulated and refrigerated by means of refrigeration elements 19 which are mounted behind a wall 20 of the compartment, and which are cooled by a refrigeration unit 21 below the partition 15. In use, a preferably disposable container 22 is placed in the compartment 16 and is filled or refilled with a whipping cream, a similar whippable vegetable fat cream, or another whippable food product in liquid form. A pump 23, driven by an electric motor 24, draws in the liquid product from the unpressurized container 22 through a suction pipe 25, and also draws in air through an air inlet valve 26. The mixture of liquid product and air is then forced through a static homogenizer 27 where it is whipped before being discharged through an outlet 28 when a solenoid-operated outlet valve 29 is opened.

A second container 22' is also placed in the compartment 16 to hold an additive which is introduced into the air and liquid product mix before the mix enters the static homogenizer 27. The additive may be a flavoring, a coloring, or the like. Preferably, it is a puree or a concentrated liquid form which is fed through a suction pipe 25' in a manner hereafter more fully described.

Either container 22 or 22' may be the original container in which the product is delivered and, in this manner pouring of the product is eliminated. The containers may be disposed outside the machine, if desired. When these arrangements are used, cleanliness is greatly increased and the bacteria count is kept remarkably low.

As best shown in FIG. 2, the suction tube 25 is a rigid metal pipe having a foot 30 fitted with a sieve 31 through which the liquid product is drawn. Tube 25 can also be a plastic hose, if desired. The pipe 25 extends up into a priming chamber 32 from which the liquid product is drawn along a duct 34 and through a releasable screw coupling 35 into a valve block 36 which contains an annular chamber 37. An adjustable air plug 39 also communicates with the chamber 37 so that, when operated, the pump 23 draws in the liquid product and air simultaneously. The liquid product and air is drawn from the chamber 37 through a duct 54 which leads into the pump inlet. The amount of induced air can be controlled by adjusting the air plug 39. The air plug 39 may be of any suitable construction and one preferred construction is shown in my U.S. Pat. No. 3,700,214, and another in my application Ser. No. 247,575, filed Apr. 26, 1972, now U.S. Pat. No. 3,758,080.

The pump 23 has a housing 55 having a cylindrical chamber 56 which cOntains an eccentric rotor 57 mounted on the upper end of a spindle 58 and contained in a turret 60. The spindle 58 is releasably coupled to a driving shaft from the motor 24 by means of a keying coupling 61. The rotor 57 has a diametrical slot in which two synthetic resin vanes 62 are radially slidable. Vanes 62 are urged radially outwardly to engagement with the wall of the chamber 56 by means of a pair of helically coiled compression springs 63. A head 64, containing the aforementioned valve block 36, is mounted by bolts 65 extending into the turret 60. The pump as thus far described is identical both in the prior art arrangement of FIG. 3 and the improved apparatus best shown in FIG. 4, and the same numerals indicate the same parts in both views.

Referring now more particularly to FIG. 3, the prior art construction includes a nylon thrust washer 71 at the lower end of the rotor 57. A shaft seal 72 engages the spindle 58 closely adjacent the nylon thrust washer 71. The shaft seal 72 is positioned by a backing ring 73. A pair of needle roller bearings 74 are positioned to engage the spindle 58. At the bottom of the lower needle bearing 74 is a seal 75 held in place by a ring 76. The head of the pump includes the aforementioned valve block, and the face of the head adjacent the rotor 57 is recessed as shown at 77. Into the recess is molded a layer 78 of synthetic resin in which the inlet and outlet ports to the pump are located. The recess and plastic insert is illustrated and described in German Gebrauchsmuster 1,956,184 registered on Feb. 23, 1967 in the name of Josef Mayer.

In this prior construction, one failure occurs through wear on the shaft 58 and seal 72. If the seal 72 does not have a spring-loaded lip, the seal has a tendency to be partially turned inside out during use. When fitted with the spring-loaded lip as shown in FIG. 3, wear on the pump shaft 58 is severe. Since the pump is designed to handle a food product, it must be thoroughly washed and cleaned. When washing the pump, the pump is under a lower pump pressure condition and the water flows past the seal, and damages the bearings.

Referring to FIG. 4, the new construction utilizes an elastomeric face seal 81 between the lower end of the rotor 57 and the pump housing 55. Face seal 81 is preferably formed of neoprene (polychloroprene). With this seal in place, a smaller shaft seal 82 is utilized between the shaft 58 and the housing 55. A passageway 83 is provided through the housing to vent the area between seals 81 and 82 to the inlet side of the pump. A backing ring 84 is fitted under seal 82 and a sealed-type needle roller bearing 85 supports the shaft 58 at its upper end. A combined needle roller bearing and ball thrust bearing 86 supports the shaft 58 at its lower end and takes care of axial loading. A bearing retaining collar 87 embodies an O-ring grease seal 88 at the lower end of the assembly. A clip 89 retains the entire bearing assembly within the housing 55.

As mentioned above, in the prior construction, a plastic wear pad was molded into recess 77. Another failure occurs when the wear pad wears out. Replacement is very difficult, usually necessitating returning the pump, or at least the pump head 64, to the manufacturer. To eliminate this difficulty, the present invention eliminates the recess 77 and provides a combination seal and wear pad 92 shaped to underlie the bottom side of the head 64. The combination seal and wear pad 92 is in the form of a polypropylene disk stamped out of sheet material, and which has an arcuate opening 93 for the inlet to the pump and an outlet opening 94. The disk also has bolt holes 95 through which the bolts 65 may pass. The new disk serves as a combination sealing gasket and wear pad which separates the inlet and outlet openings of the pump. It is deemed apparent that the disk 92 can be easily replaced by removing the head 64.

An alternate construction of a combination seal and wear pad 92' is illustrated in FIG. 7. This construction utilizes J-shaped slots 95' so that the part can be replaced without total removal of the head or cover plate 64 from the pump. The bolts need only be loosened enough to remove the disk and a replacement disk can be easily slipped into position. The J-shaped slots 95' are arranged so that the rotation of the pump urges the combination seal and wear pad 92' against the bolts 65.

Another construction of a combination seal and wear pad is shown at 92" in FIG. 8. This construction utilizes oppositely facing U-shaped slots 95" which accommodate slightly different spacing of the bolts 65.

As the pump is operated, the whipping cream with the induced air is pumped from the pump inlet out through its outlet into a duct 98 (see FIG. 2) under a pressure of at least 100 p.s.i. The duct 98 is, in the absence of a differential pressure, closed by a valve consisting of a ball 99 which is urged downwardly to close a seat at the upper end of the duct 98, by means of a helically coiled compression spring 100. When the pump is operated, the ball 99 is forced against the action of the spring 100 under the pressure differential and opens the duct 98 so that the mixture of product and air can flow into a duct 102.

Interposed between the duct 102 and the static homogenizer 27 is an apparatus, generally designated 110 for introducing an additive, such as previously described, into the whipped cream and air mixture. The apparatus 110 is in the form of an ejector formed in an elongate housing 111. At the inlet end of the ejector is a nozzle 113 which produces a high velocity jet of the liquid product and air mix. The additive is drawn into the ejector from the unpressurized container 22' by way of the conduit 25' and inlet opening 114 through the housing 111 at one side of the nozzle 113. The additive mixes with the jet, and the total mixture enters a diffuser 112 where it is compressed and discharged into a region of higher pressure beyond the diffuser. The product and air is supplied to the nozzle at a pressure considerably higher than the pressure at which the additive is to be discharged. In the nozzle occurs a tremendous increase of velocity. Between the inlet duct 114 and the outlet end of the nozzle there is a slight increase in velocity of the additive as it is drawn into the ejector. At the outlet end of the nozzle 113 the additive mixes at nearly constant pressure and with an increase in velocity of the additive and a decrease in velocity of the liquid product and air mix. Various forms of ejectors may be utilized and the construction shown is to be taken only as illustrative of one suitable form of the apparatus. At the outlet of the diffuser 112 is located a solenoid-operated valve 116, or any equivalent valve, which prevents backflow from the homogenizer 27 into the ejector when the pump is stopped.

It is contemplated that the additive may be introduced at other locations between the pump inlet and homogenizer outlet; however, it is preferable that the additive not pass through the pump for reasons previously mentioned. Also the additive must be adequately mixed with the whipped product and hence must be suitably introduced before the homogenizer outlet.

The suction pipe 25' may be a flexible hose long enough to extend to the bottom of second container 22'. One end of the hose is fitted to a coupling 132 adjacent inlet opening 114. The end of the hose is pushed over the coupling and a clamp (not shown) may be applied if desired. The other end of the hose is provided with a comparatively heavy foot 135 having a coupling 136 over which the hose is pushed. The foot 135 incorporates a check valve 137 which closes automatically when the machine pump stops to retain the pipe 25' primed full of the liquid additive. Radial webs 138 on the underside of the foot 135 prevent a suction seal being formed with the bottom of the container 22'.

Interposed in suction pipe 25' may be a valve 140. By adjusting the valve, it will serve to selectively vary the ratio of additive to whippable product. Obviously the valve may be shut off and the machine utilized to dispense the whipped food product without the additive.

The static homogenizer 27 may be of any suitable construction. One form of static homogenizer which may be utilized in the present invention is shown and described in detail in my U.S. Pat. No. 3,700,214, or my British Patent Specification No. 1,250,495 published 20 Oct., 1971.

Figure 1:
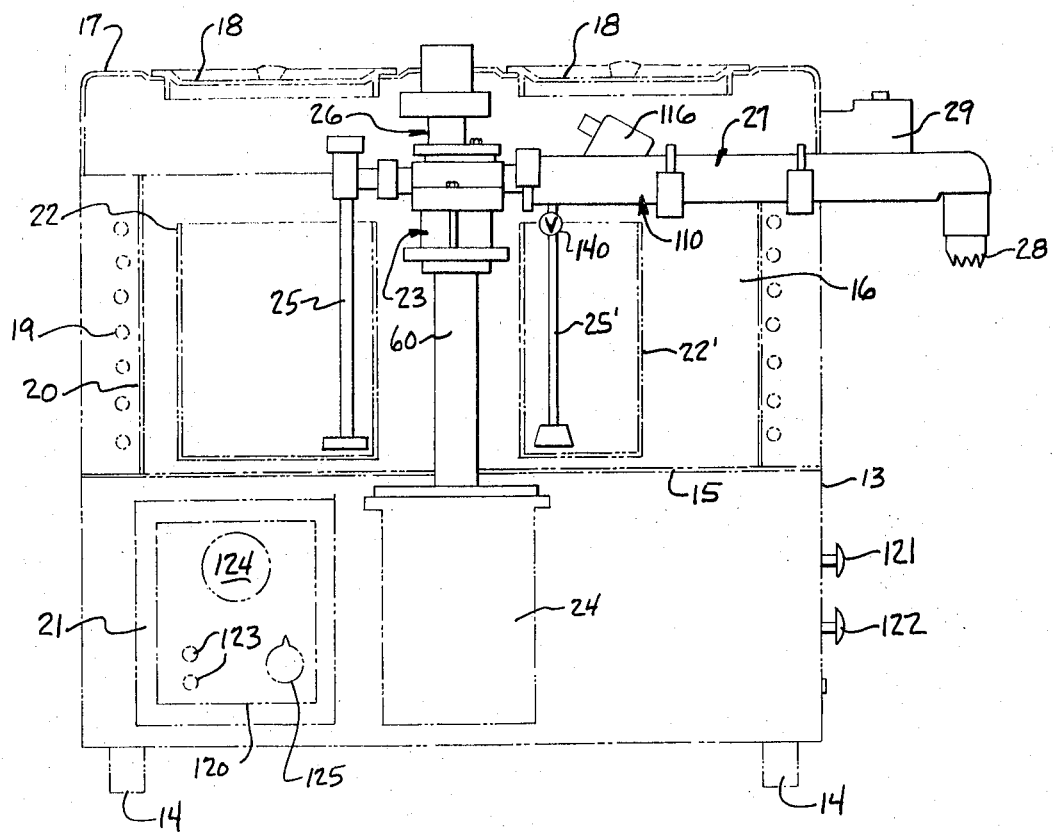
FIG. 1 is a side elevation of a preferred embodiment with some portions shown in phantom lines.

The machine has a control system which insures that the pump motor 24 operates only when the solenoid-operated valves 29 and 116 are open, and vice versa. This is illustrated diagrammatically in FIGS. 1 and 8. A control panel 120 is mounted on the far side of the machine as seen in FIG. 1 and operates in association with the two control knobs 121 and 122 mounted in the front of the front panel of the machine housing 13. The control panel 120 incorporates a main on-off switch 123 which energizes the refrigeration system and supplies power to the controls. A temperature gauge 124 indicates the temperature in the compartment 16 and a knob 125 is provided for presetting the time for which the machine may run when operated automatically.

As indicated in FIG. 8, pressing knob 121 operates a switch 127 which causes the solenoid of valve 29 or its equivalent valve to be energized so that the valve is opened. Simultaneously, the motor is started and the solenoid of valve 116 is energized and that valve opened. In this manner, the pump 23 is operated simultaneously with the opening of valves 29 and 116. As a result, product will immediately be discharged through the nozzle 28 and this will continue until the knob 121 is repressed whereupon the switch 127 will reopen and deenergize the solenoids and stop the motor 24 so that the pump stops and the valves 29 and 116 reclose, simultaneously.

If the knob 122 is pressed, a switch 128 sends a signal to a timer 129, which has been preset by the knob 125, whereupon the valves 29 and 116 are opened and the motor 24 is started. After the preset time, the valves are automatically reclosed with the simultaneous stopping of the motor. During this time a preset portion of the product will be dispensed from the nozzle 28. Subsequent repressing of the knob 122 will cause a further portion to be dispensed and the aggregate number of portions dispensed may be recorded on a digital indicator 130.

The simultaneous operation of the pump motor 24 and the valves 29 and 116 is important because it insures that the product flow path between the pump and the outlet valve 29 remains under pressure between the valves 29 and 116 when the machine is stopped intermittently. There is therefore no delay when the machine is restarted and no oozing occurs as a result of the expansion of the product when the pump stops, and no unwhipped product is dispensed upon subsequent start even when dispensing minute sized portions (e.g. as low as one-fourth ounce).

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

1. A machine for producing whipped cream and other stiff flowable aerated emulsion food products, the machine comprising a motor-driven, rotary vane pump having an inlet and an outlet, an air intake operatively connected to the pump inlet, an unpressurized liquid product container, a suction tube leading from the container and operatively connected to the pump inlet, whereby in use the whippable liquid food product and air are simultaneously drawn into the pump, apparatus connected to the pump outlet and defining a flow path along which the mixture of liquid product and air is pumped to a product discharge outlet, and the flow path including a static homogenizer for emulsifying the mixture; characterized in that the pump has a housing defining a pump chamber; a rotor in the pump chamber; a head overlying one end of the pump chamber and having a flat face at said one end through which the inlet and outlet communicate axially with the pump chamber; a plurality of bolts extending through the head into the housing to removably mount the head on the housing; and a combination seal and wear pad substantially co-extensive with the flat face of the head and engaged with the body and rotor; the combination seal and wear pad having openings for the passage of the bolts, and openings mating with the inlet and outlet in the head.

2. A machine as set forth in claim 1 wherein the bolt openings in the combination seal and wear pad extend to the periphery thereof.

3. A machine as set forth in claim 1 wherein the combination seal and wear pad is a polypropylene disk stamped out of sheet material.

4. A machine as set forth in claim 1 wherein the combination seal and wear pad is made of ceramic and has a highly polished surface on the side facing the rotor.

5. A machine as set forth in claim 1 including a second product container for holding an additive to be mixed with the liquid product and air; a second suction tube leading from the second container; and means interposed between the pump inlet and the outlet of the static homogenizer for feeding the additive into the mixture of liquid product and air before it is discharged from the static homogenizer.

6. A machine as set forth in claim 1 including a drive shaft connecting the rotor to the motor; the drive shaft extending through the housing opposite said one end; a shaft seal between the shaft and housing; a face seal between the rotor and housing and located adjacent the shaft seal; a passageway in the housing for venting the area between the shaft seal and face seal; and a thrust bearing for taking the axial thrust on the pump.

7. A machine as set forth in claim 6 wherein the passageway communicates the area between the shaft seal and face seal with the inlet side of the pump.

8. A machine as set forth in claim 6 wherein the face seal is in the form of a flat washer made of neoprene.

9. A machine as set forth in claim 6 wherein the thrust bearing is located intermediate the ends of the drive shaft; and including a plurality of needle bearings between the shaft and housing on either side of the thrust bearing.

10. A machine as set forth in claim 9 wherein the drive shaft has a reduced diameter portion at the thrust bearing in which the thrust bearing is partly disposed.

11. A machine as set forth in claim 10 including a second product container for holding an additive to be mixed with the liquid product and air; and means interposed in the flow path upstream of the static homogenizer and operatively connected to the second container for feeding the additive into the mixture of liquid product and air as the pump is operated.

12. A machine for producing whipped cream and other stiff flowable aerated emulsion food products, the machine comprising a housing, a pump in the housing and having an inlet and an outlet, a motor for driving the pump, an air intake operatively connected to the pump inlet, an unpressurized liquid product container for holding a whippable liquid food product, a suction tube leading from the container and operatively connected to the pump inlet, whereby in use the whippable liquid food product and air are simultaneously drawn into the pump, apparatus connected to the pump outlet and defining a flow path along with the mixture of liquid product and air is pumped to a product discharge outlet, and the flow path including a static homogenizer for emulsifying the mixture; the improvement comprising: a second product container in the housing for holding an additive to be mixed with the liquid product and air; a second suction tube leading from the second container; and means interposed between the pump inlet and the static homogenizer for feeding the additive into the mixture of liquid product and air before it reaches the static homogenizer.

13. A machine as set forth in claim 12 wherein the last-mentioned means is located between the pump outlet and the static homogenizer.

14. A machine as set forth in claim 13 wherein the last-mentioned means is in the form of an ejector having a nozzle through which the mixture of liquid product and air is pumped.

15. A machine as set forth in claim 14 in which the ejector includes a diffuser downstream of the nozzle.

16. A machine as set forth in claim 15 including a valve between the ejector and static whipping tube; the valve being arranged to open when the pump is operated and to close and prevent backflow from the static whipping tube when the pump is stopped.

17. A machine as set forth in claim 16 including control means for starting the pump simultaneously with opening the valve and for stopping the pump simultaneously with closing the valve.

18. A machine as set forth in claim 17 wherein the motor is an electric motor; the valve is a solenoid-operated valve; and the control means is an electric circuit simultaneously controlling the valve and motor.

19. A machine for producing whipped cream and other stiff flowable aerated food products and comprising a motordriven pump having an inlet and an outlet, an air intake operatively connected to the pump inlet, an unpressurized liquid product container for holding a whippable liquid food product, a suction tube leading from the container and operatively connected to the pump inlet, whereby in use the whippable liquid food product and air are simultaneously drawn into the pump, and a static homogenizer operatively connected to the pump outlet for emulsifying the mixture of liquid product and air pumped thereto; the improvement comprising: a second unpressurized liquid product container for holding a liquid additive to be mixed with the liquid product and air; and an ejector interposed between the pump outlet and static homogenizer and operatively connected to the second container for drawing the liquid additive into the mixture of liquid product and air as the pump is operated.

20. The combination of claim 19 including means for starting and stopping the pump; and a valve disposed between the ejector and static whipping tube, and operative to open when the pump is operated and to close and prevent backflow from the static whipping tube when the pump is stopped.

* * * * *